United States Patent
Batzner et al.

(10) Patent No.: US 9,673,677 B2
(45) Date of Patent: Jun. 6, 2017

(54) MOUNTING ARRANGEMENT FOR AN ELECTRIC MOTOR AND A DRIVE UNIT INCORPORATING SAME

(75) Inventors: Marco Batzner, Holly, MI (US); Daniell Wagner, Lake Orion, MI (US)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 188 days.

(21) Appl. No.: 13/604,737

(22) Filed: Sep. 6, 2012

(65) Prior Publication Data

US 2014/0062240 A1    Mar. 6, 2014

(51) Int. Cl.
*H02K 5/15* (2006.01)
*H02K 5/22* (2006.01)
*H02K 7/116* (2006.01)

(52) U.S. Cl.
CPC .............. *H02K 5/15* (2013.01); *H02K 5/225* (2013.01); *H02K 7/1166* (2013.01)

(58) Field of Classification Search
CPC ........ H02K 5/15; H02K 7/1166; H02K 5/143; H02K 11/044; H02K 5/225; H02K 2211/03
USPC ............................................... 310/91, 89, 90
See application file for complete search history.

(56) References Cited

U.S. PATENT DOCUMENTS

| | | | | |
|---|---|---|---|---|
| 5,126,607 A * | 6/1992 | Merriman, Jr. | .......... | H02K 5/24 248/638 |
| 6,713,913 B1 * | 3/2004 | Hager | ...................... | H02K 5/15 310/89 |
| 7,939,981 B2 * | 5/2011 | Fornoff | .................... | H02K 5/00 310/89 |
| 7,992,465 B2 * | 8/2011 | Haussecker | ............. | H02K 5/00 310/89 |
| 2007/0272471 A1 * | 11/2007 | Kuroumaru | .......... | B62D 5/0412 180/444 |
| 2008/0197733 A1 * | 8/2008 | Oberle | ................. | H02K 7/1166 310/89 |

FOREIGN PATENT DOCUMENTS

CN            1153885 C        6/2004

OTHER PUBLICATIONS

Chinese Office Action in CN 201310395105.7 dated Aug. 10, 2015.

* cited by examiner

*Primary Examiner* — Joshua Benitez Rosario
*Assistant Examiner* — Leda Pham
(74) *Attorney, Agent, or Firm* — Manelli Selter PLLC; Edward J. Stemberger

(57) ABSTRACT

The present invention provides a mounting arrangement for an electric motor in a drive unit, and a drive unit incorporating such a mounting arrangement. The arrangement includes a motor casing with at least one connecting flange having an opening for receiving a connecting element. The flange is configured for fastening the motor casing to a drive unit housing via the connecting element. At least one alignment member is provided on the flange for engagement with a complementary member on the drive unit housing to align the motor casing with respect to the drive unit. The at least one alignment member is provided on or in a peripheral edge of said connecting flange.

10 Claims, 2 Drawing Sheets

MOUNTING ARRANGEMENT FOR AN ELECTRIC MOTOR AND A DRIVE UNIT INCORPORATING SAME

FIELD OF THE INVENTION

The present invention relates to a mounting arrangement for mounting an electric motor in a drive unit. The present invention further relates to a drive unit incorporating an electric motor, particularly for activating or operating driven devices in an automobile or other vehicle.

BACKGROUND OF THE INVENTION

As noted in U.S. Pat. No. 6,713,913, drive units for operating windows, sun-roof systems and other accessories in automobiles typically comprise an electric motor. A casing of the motor, also known as a pole cover or pole "pot", is usually mounted to a transmission housing of the drive unit, which may optionally include an integrated electronics housing. Furthermore, a separate component may be arranged between the electric motor casing and the gearing or transmission housing as a brush holder that may simultaneously serve as seal between casing and housing. The motor casing or pole cover may comprise a deep-drawn, roughly cylindrical casing having one or more flange at its open end provided with holes to accommodate screw fasteners. Internal threads may be provided in a corresponding flange of the gearing or transmission housing, into which the screw fasteners or bolts are screwed to rigidly connect the casing and housing parts with one another.

SUMMARY OF THE INVENTION

Accordingly, it is an object of the present invention to provide an improved mounting arrangement for an electric motor in such a drive unit, to provide for simple and reliable alignment of the electric motor with respect to the drive unit, while desirably also ensuring a robust and durable drive unit construction.

According to one aspect, therefore, the invention provides a mounting arrangement for an electric motor in a drive unit, including: a motor casing having at least one connecting flange, the flange being configured for fastening the motor casing to a drive unit housing via a connecting element; and at least one alignment member provided on the flange for engagement with a complementary member on the drive unit housing to align the motor casing with respect to the drive unit, wherein the at least one alignment member is provided on or in a peripheral edge of the connecting flange. The at least one connecting flange preferably includes an opening or hole for receiving a connecting element, such as a screw or bolt, for fastening the motor casing to the drive unit housing.

With the mounting arrangement of the present invention, a desired alignment of the electric motor in the drive unit can thus be provided through the configuration of a peripheral edge of the at least one connecting flange of the motor casing. In this regard, adaptations to the peripheral edge of the flange(s) can be realised in a cost effective manner and via relatively straight-forward manufacturing steps that do not require substantial a re-design of the parts of the drive unit. Furthermore, the alignment member(s) are able to provide a robust and reliable drive unit construction.

Advantages, embodiments and further developments of the present invention can be found in the claims and in the following description, referring to the drawings.

In a preferred embodiment, the at least one alignment member includes a particular shape or profile of the peripheral edge of the connecting flange, which is designed to be received in a corresponding recess in the drive unit housing. Thus, the at least one complementary member preferably comprises a shoulder or rim around or bordering the recess, and that shoulder or rim is configured to substantially abut and/or engage the peripheral edge of the connecting flange received in the recess. In a particularly preferred embodiment, the shape or profile of the peripheral edge of the connecting flange includes a corner or bend. The motor casing of the electric motor may include a plurality of connecting flanges, each of which may be received in a respective recess in the drive unit housing. Accordingly, in such an embodiment, the shoulders or rims around each of the recesses thus form a plurality of complementary members for each of the alignment members.

In another preferred embodiment, the at least one alignment member includes comprises a recess, a cut-out or an indentation in the peripheral edge of the connecting flange for receiving a corresponding projection on the drive unit housing. Thus, the at least one complementary member in this case comprises the corresponding projection. Preferably, the recess, cut-out or indentation in the peripheral edge of the connecting flange is formed substantially in or parallel to a plane of the flange. Furthermore, the recess, cut-out or indentation is desirably adapted for form-fitting receipt of the corresponding projection on the drive unit housing. As noted above, the motor casing preferably comprises a number of connecting flanges. Thus, more than one, and preferably each, of the connecting flanges may include the at least one recess, cut-out or indentation in the peripheral edge thereof.

Thus, in a particular preferred embodiment the invention provides a mounting arrangement for an electric motor in a drive unit, including: a motor casing having at least one connecting flange which is configured for fastening the electric motor to a drive unit housing via a connecting element; and at least one alignment member provided on the flange for engagement with a complementary member on the drive unit housing to align the electric motor with respect to the drive unit, wherein the at least one alignment member comprises a recess, a cut-out or an indentation in a peripheral edge of the connecting flange.

In yet another preferred embodiment the at least one alignment member includes a projection from the peripheral edge of the connecting flange, the projection being designed to be received in a corresponding recess or opening in the drive unit housing. To this end, the projection preferably extends in a direction substantially perpendicular to a plane of the flange, preferably in the form of at least one prong- or finger-like element. When the motor casing has a plurality of connecting flanges, two or more of the flanges may respectively include such a projection.

Therefore, in another particular preferred embodiment the invention provides a mounting arrangement for an electric motor in a drive unit, including: a motor casing of the electric motor having at least one connecting flange with an opening for receiving a connecting element, wherein the flange is configured for fastening the motor casing to a drive unit housing via the connecting element; and at least one alignment member provided on the flange for engagement with a complementary member on the drive unit housing to align the motor casing with respect to the drive unit, wherein the at least one alignment member comprises a projection from a peripheral edge of the connecting flange, the projection being configured to be received in a corresponding recess or opening in the drive unit housing.

According to another aspect, the invention provides a drive unit for actuating devices in a vehicle, especially in an automobile, including: an electric motor having a motor casing; and a drive unit housing, e.g. for a drive unit transmission; wherein the drive unit includes a mounting arrangement for the electric motor according to any one of the embodiments of the invention described above.

According to a further aspect, the invention provides a drive unit for actuating devices in a vehicle, especially in an automobile, including: an electric motor having a motor casing; and a drive unit housing, especially for a drive unit transmission; wherein the motor casing includes at least one connecting flange for fastening the electric motor to the drive unit housing via a connecting element, the connecting element preferably being received or accommodated in an opening or hole provided in the flange; wherein the connecting flange includes at least one alignment member for engagement with a complementary member on the drive unit housing to align the electric motor with respect thereto, wherein the at least one alignment member is provided on or in a peripheral edge of the connecting flange.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

Skilled artisans will appreciate that elements in the figures are illustrated for simplicity and clarity and are not necessarily drawn to scale. That is, the chosen elements are illustrated to enhance an understanding of the functionality and arrangement of features in the various embodiments. Common and well understood elements that may be useful or necessary in a commercially feasible embodiment are not necessarily depicted in order to facilitate a less abstracted view of the embodiments. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as it accorded to such terms and expressions with respect to their corresponding respective areas of inquiry and study, except where specific meanings have otherwise be set forth herein.

In all figures of the drawings elements, features and signals which are the same or at least have the same functionality have been provided with the same reference symbols, unless explicitly stated otherwise.

DETAILED DESCRIPTION OF PREFERRED EMBODIMENTS

Figure 1:
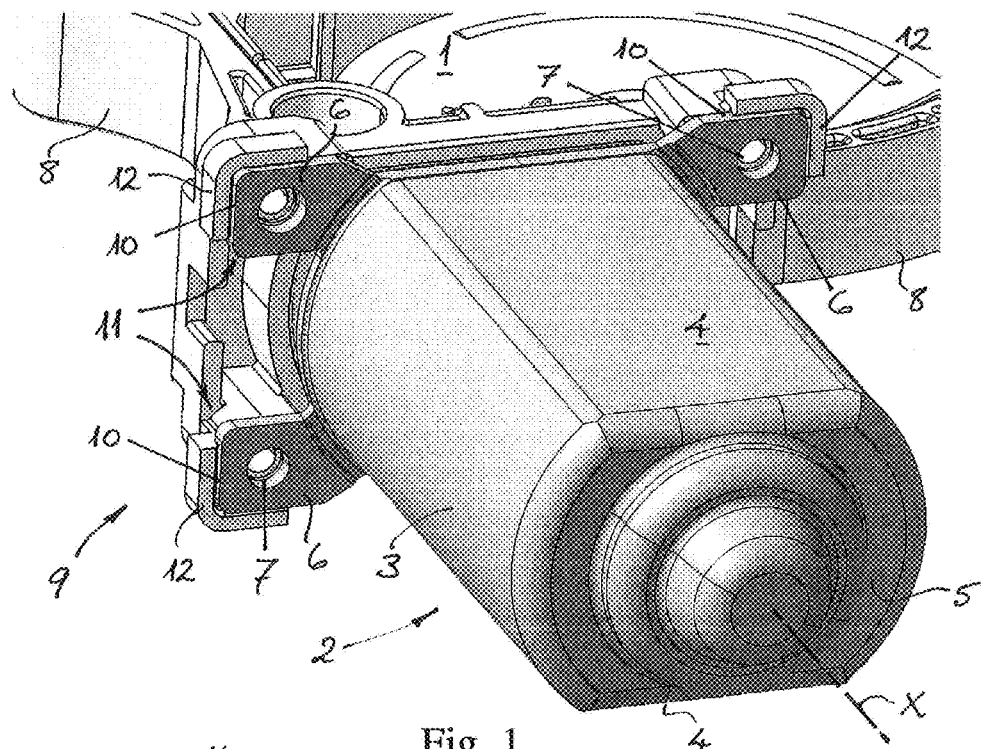
FIG. 1 shows a perspective view of an electric motor and drive unit incorporating a mounting arrangement according to a first embodiment of the invention.

With reference firstly to FIG. 1 of the drawings, a drive unit 1 for driving a powered vehicle window or sunroof system according to a first embodiment is illustrated. The drive unit 1 comprises an electric motor 2 having a motor casing 3 in a generally cylindrical form with opposite flattened sides 4. The motor casing 3 thus comprises a generally hollow body that is closed at one end 5 and forms a pole cover for the electric motor 2. At its opposite, open end, the motor casing 3 includes four flange members 6 which extend outwards in a plane substantially perpendicular to a central or longitudinal axis X of the casing 3, which generally corresponds to a rotor axis of the motor 2.

Each of the flange members 6 includes a bore or hole 7 for receiving a connecting element (not shown) in the form of a fastener, such as a screw or bolt, for mounting the electric motor 2 by the casing 3 to a housing 8 of the drive unit 1. In this regard, the housing 8 of the drive unit 1 in this embodiment includes a transmission housing for a transmission or gearing assembly via which the drive torque from the electric motor 2 is transmitted to a device (e.g. window or sunroof) to be driven. A mounting arrangement 9 for mounting the electric motor 2 in the drive unit 1 generally refers to the physical interface between the motor casing 3 and the drive unit housing 8. In this regard, the mounting arrangement 9 in this embodiment includes alignment members 10 in the form of angled or cornered profiles or shapes of each of the respective flange members 6, which are configured to be received in respective recesses 11, which are surrounded or bordered by complementary shoulder or rim members 12 that follow an angle corresponding to the outer or peripheral edge of each of the respective flange members 6. In particular, the shoulder or rim members 12 around the recesses 11 are configured to abut and/or engage the alignment profiles 10 of the flange members 6 when the flange members 6 are received in the respective corner recesses 11 of the drive unit housing 8. The peripheral edges 10 of the flange members thereby cooperate and interact with complementary shoulder or rim members 12 of the drive unit housing 8 to align the motor casing 3 and thereby also the electric motor 2 itself, with respect to the drive unit 1, as is apparent from the fact that the bores or holes 7 in each flange member 6 is thereby automatically aligned with corresponding holes in the drive unit housing 8 for receiving the respective fastener elements.

Figure 2:
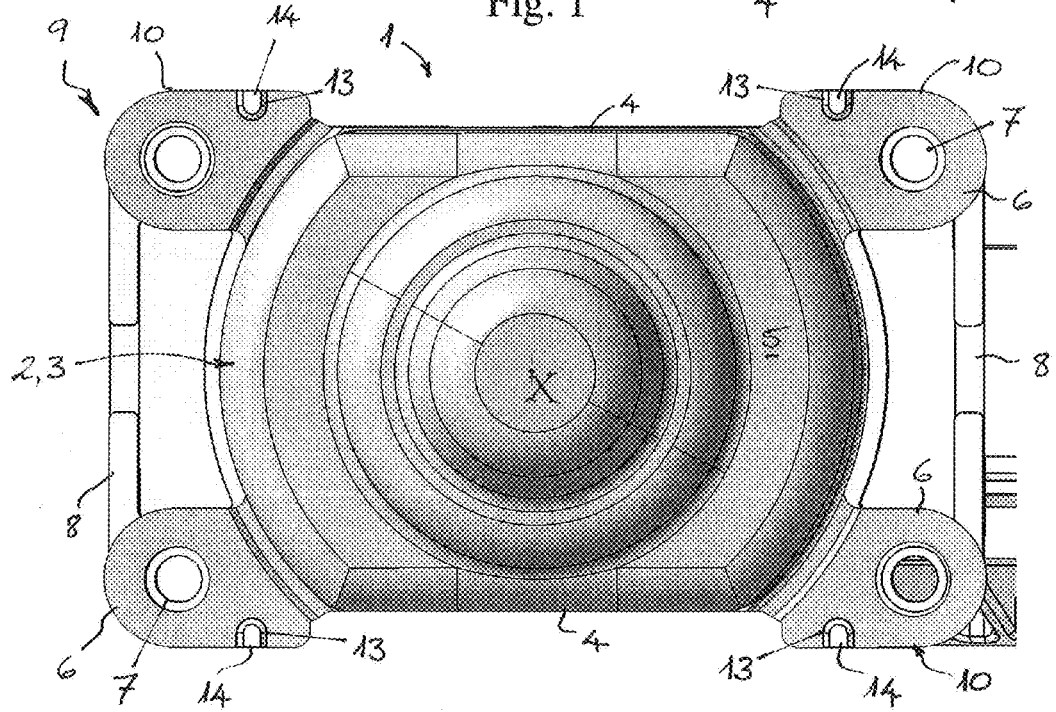
FIG. 2 shows a front view of an electric motor and drive unit incorporating a mounting arrangement according to a second embodiment of the invention.

With reference now to FIG. 2 of the drawings, a second embodiment of a drive unit 1 and a mounting arrangement 9 is illustrated. In this case, an alignment member 13 in a peripheral edge 10 of each flange member 6 is provided in the form of a generally U-shaped recess, cut-out or indentation 13 for receiving a complementary projection member 14 on the drive unit housing 8. In particular, each of the projection members 14 on the housing 8 is sized and shaped for form-fitting engagement with a respective one of the recesses or indentations 13 formed in the peripheral edge 10 of each flange member 6. Again, it is apparent that the alignment members 13 and their respective complementary projection members 14 provide for a proper alignment of the electric motor 2 with respect to the drive unit 1, as the holes 7 in each flange member 6 are aligned with corresponding holes in the drive unit housing 8 for receiving respective fastener elements.

Figure 3:
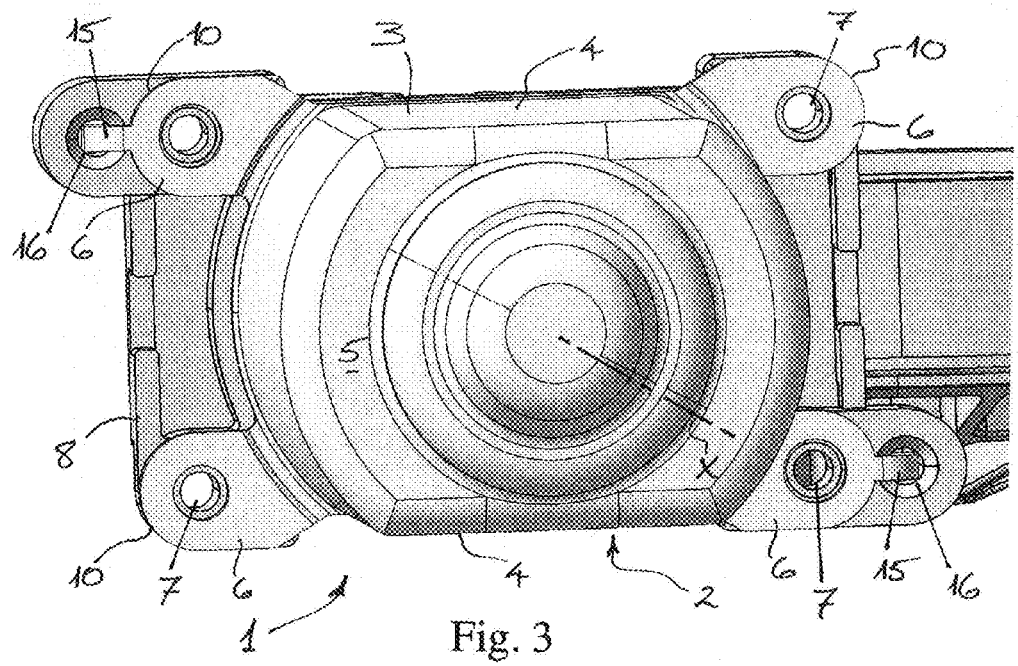
FIG. 3 shows a front view (at slight perspective angle) of an electric motor and drive unit incorporating a mounting arrangement according to a third embodiment of the invention.
Figure 4:
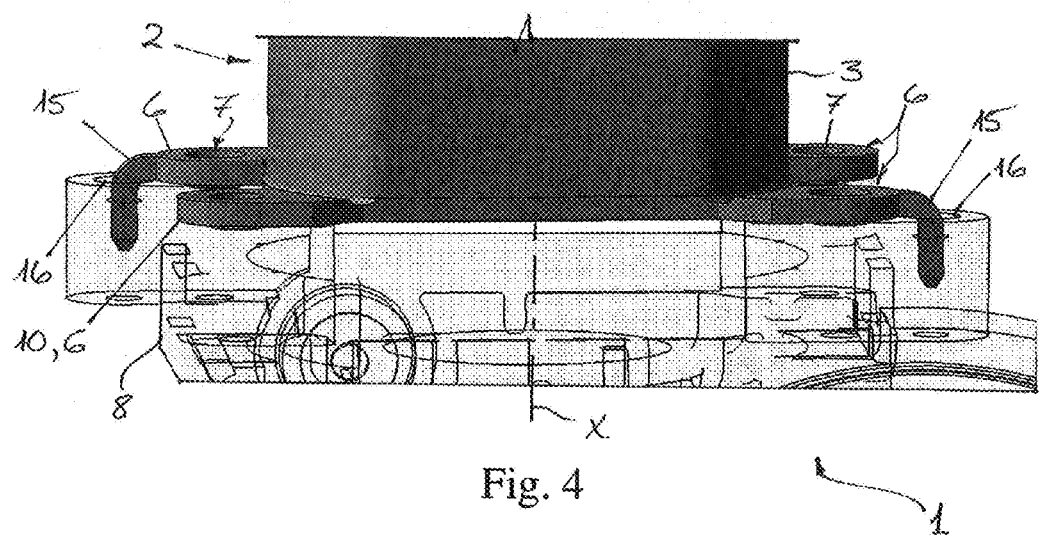
FIG. 4 shows a partially transparent partial side view (at a slight perspective angle) the electric motor and drive unit according to the third embodiment shown in FIG. 3.

With reference now to FIGS. 3 and 4 of the drawings, a third embodiment is illustrated in which two of the flange members 6 (i.e. diagonally opposite to one another) incorporate a finger or prong-like projection 15 from a peripheral edge 10 of the flange member 6. This projection 15 bends through an angle of approximately 90° out of a plane of the flange member 6 to extend generally perpendicular to the plane of the flange member. The drive unit housing 8, on the other hand, includes corresponding holes or recesses 16 for receipt of the two finger or prong-like projections 15. In this embodiment, therefore, the complementary members in the drive unit housing 8 are provided in the form of the holes or openings 16 for receiving a free end of the respective alignment member projections 15 to properly position and align the electric motor 2 in the drive unit 1.

In each of the embodiments of FIGS. 1 to 4 it will be noted that the alignment members 10, 13, 15 formed in or on a peripheral edge of the flange members 6 of the motor casing 3 and the respective complementary members 12, 14, 16 formed on the housing 8 of the drive unit 1 are preferably arranged such that only a single orientation of the motor casing 3 with respect to the of the drive unit housing 8 is possible, to ensure that a correctly aligned orientation of the electric motor 2 is necessarily achieved via the mounting arrangement 9 of the present invention.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

LIST OF REFERENCE NUMERALS 1 drive unit
2 electric motor
3 motor casing
4 flattened sides of casing
5 closed end of casing
6 flange member
7 bore or hole
8 housing of drive unit
9 mounting arrangement
10 peripheral edge of flange member
11 recess drive unit housing
12 shoulder or rim member
13 cut-out or indentation in edge of flange member
14 complementary projection member
15 finger or prong-like projection
16 complementary hole or opening
X casing and/or rotor axis

What is claimed is:

1. A mounting arrangement for an electric motor in a drive unit, comprising:
a motor casing having a longitudinal axis with at least one connecting flange extending outwardly from and perpendicular to the longitudinal axis, the at least one connecting flange having an opening extending through a surface thereof, the opening having an axis substantially parallel to the longitudinal axis and the opening being configured for receiving a connecting element, wherein the connecting flange is configured for fastening the motor casing to a drive unit housing via the connecting element; and
at least one alignment member provided on the connecting flange for engagement with at least one complementary member on the drive unit housing to align the motor casing with respect to the drive unit, wherein the at least one alignment member is defined as at least part of a peripheral edge of said connecting flange and wherein the at least part of the peripheral edge directly engages the at least one complementary member to directly and reliably position the electric motor.

2. The mounting arrangement of claim 1, wherein the at least one alignment member comprises a shape or profile of the peripheral edge of the connecting flange, wherein the connecting flange is received in a corresponding recess in the drive unit housing, and wherein the at least one complementary member comprises a shoulder or rim around the recess which engages the peripheral edge of the connecting flange received in the recess.

3. The mounting arrangement of claim 2, wherein the at least one connecting flange includes at least a first and a second connecting flange, each of the first and second connecting flanges is received in a respective recess in the drive unit housing, wherein the at least one complementary member includes at least a first and a second complementary member, each complementary member comprises a shoulder or rim around a corresponding recess.

4. The mounting arrangement of claim 2, wherein the shape or profile of the peripheral edge of the connecting flange includes a corner or bend.

5. The mounting arrangement of claim 1, wherein the at least one alignment member comprises a recess, cut-out or indentation in the peripheral edge of the connecting flange for receiving a corresponding projection on the drive unit housing, wherein the at least one complementary member comprises said corresponding projection.

6. The mounting arrangement of claim 5, wherein the recess, cut-out or indentation in the peripheral edge of the connecting flange is substantially in or parallel to a plane of the flange and is shaped for form-fitting receipt of the corresponding projection on the drive unit housing.

7. The mounting arrangement of claim 5, wherein the at least one connecting flange includes at least a first and a second connecting flange, each connecting flange comprises at least one recess, cut-out or indentation in the peripheral edge thereof.

8. The mounting arrangement of claim 1, wherein the at least one alignment member comprises a projection from the peripheral edge of the connecting flange, which is received in a corresponding recess or opening in the drive unit housing.

9. The mounting arrangement of claim 8, wherein the projection extends in a direction substantially perpendicular to a plane of the flange, preferably in the form of a prong- or finger-like element.

10. The mounting arrangement of claim 9, wherein the motor casing comprises a plurality of connecting flanges, at least two of which respectively includes a said projection.

* * * * *